(12) United States Patent
Schnitzer et al.

(10) Patent No.: US 8,443,696 B2
(45) Date of Patent: May 21, 2013

(54) STEERING COLUMN WITH CRASH DEVICE

(75) Inventors: Rony Schnitzer, Ruggell (LI); Martin Rohr, Feldkirch (AT)

(73) Assignee: ThyssenKrupp Presta AG, Eschen (LI)

( * ) Notice: Subject to any disclaimer, the term of this patent is extended or adjusted under 35 U.S.C. 154(b) by 733 days.

(21) Appl. No.: 12/522,492

(22) PCT Filed: Dec. 13, 2007

(86) PCT No.: PCT/EP2007/010924
§ 371 (c)(1),
(2), (4) Date: Jul. 8, 2009

(87) PCT Pub. No.: WO2008/083811
PCT Pub. Date: Jul. 17, 2008

(65) Prior Publication Data
US 2010/0018340 A1   Jan. 28, 2010

(30) Foreign Application Priority Data
Jan. 9, 2007   (DE) .......................... 10 2007 002 091

(51) Int. Cl.
*B62D 1/18*   (2006.01)
*B62D 1/00*   (2006.01)

(52) U.S. Cl.
USPC ........................................... 74/493; 280/777

(58) Field of Classification Search
USPC ..................... 74/492, 493, 495; 280/775, 777
See application file for complete search history.

(56) References Cited

U.S. PATENT DOCUMENTS 3,600,971 A * 8/1971 Scarvelis et al. ................. 74/492
5,673,937 A * 10/1997 Fevre et al. .................... 280/777
(Continued)

FOREIGN PATENT DOCUMENTS

DE   694 16 261 T2   9/1999
DE   100 25 980 A1   12/2000
(Continued)

OTHER PUBLICATIONS

English Translation of Form PCT/IB/338 and PCT/ISA/237 (Seven (7) pages).

(Continued)

*Primary Examiner* — Justin Krause
*Assistant Examiner* — Gregory Prather
(74) *Attorney, Agent, or Firm* — Crowell & Moring LLP (57) ABSTRACT

The invention relates to a steering column for a motor vehicle, having a device for absorbing energy in the case of a crash. Such a steering column should be disclosed which is built in a structurally simple manner, produced with few individual components, and requiring no more space in the radial direction than does a steering column which does not have an energy absorption device. Therefore, an adjustable steering column for a motor vehicle is suggested, comprising a) a steering shaft which is rotatably mounted about the longitudinal axis thereof in an operating element, said operating element having at least one first resistance element; b) a holding element having at least one wall surface, wherein the operating element in the assembled state of the steering column is arranged to be axially guided and displaceable, at least in the case of a crash, inside the holding element, and the first resistance element of the operating element is associated with the wall surface; c) wherein the at least one wall surface of the holding element comprises a crash element which projects in the direction of the operating element, and said crash element can itself be deformed by the operating element and the relative displacement during a crash between the operating element and the holding element, while dissipating energy, and/or the wall surface of the holding element deforms while dissipating energy.

14 Claims, 7 Drawing Sheets

U.S. PATENT DOCUMENTS

| | | | |
|---|---|---|---|
| 6,419,269 B1 * | 7/2002 | Manwaring et al. | 280/775 |
| 6,659,504 B2 * | 12/2003 | Riefe et al. | 280/777 |
| 2005/0006889 A1 | 1/2005 | Born et al. | |
| 2006/0214410 A1 * | 9/2006 | Sawada et al. | 280/775 |

FOREIGN PATENT DOCUMENTS

| | | |
|---|---|---|
| DE | 101 41 078 C1 | 4/2003 |
| EP | 0 713 820 A1 | 5/1996 |
| EP | 0 936 130 A1 | 8/1999 |

OTHER PUBLICATIONS

International Search Report dated Apr. 14, 2008 with an English translation (Four (4) pages).

Form PCT/ISA/237 (Seven (7) pages).

* cited by examiner

STEERING COLUMN WITH CRASH DEVICE

The invention relates to a steering column for a motor vehicle, which is fitted with a device by means of which, in the event of a crash, the kinetic energy, which is generated in the event of a crash-induced relative movement of an operating element with respect to a holding element of the steering column, is absorbed.

In the event of an accident (a crash) the driver of a motor vehicle is accelerated in the direction of the steering wheel and collides with the steering wheel. The impact energy of this collision acts upon the steering column. If the steering column does not yield under the influence of the impact energy but rather remains rigidly in place the risk of injury for the driver is high. In attempting to increase the driver's safety in the event of a crash and to reduce the risk of injury, steering columns have been proposed which yield under the influence of the impact energy so as to reduce the impact for the driver. The yielding of the steering column is achieved in that a specific component group of the steering column is displaced relative to the steering column support fixedly connected to the vehicle. In relation to this it is already known, in the case of such steering columns, to provide devices (so-called crash elements) which convert the kinetic energy of the moved steering column assembly into deformation work and thus reduce energy.

Various embodiments of corresponding steering columns with crash devices for energy absorption are known from the prior art. From DE 694 16 261 T2 a system is known in which, between a bracket-shaped support and a tubular body, in which the steering spindle is rotatably mounted, an additional deformation element is provided which deforms in an energy-absorbing manner in the event of a crash. In this known steering column the tubular body has orifices through which a locking system extends with which the tubular body can be locked in a support. However, the orifices in the tubular body each have an exit which is disposed in the direction of the steering wheel of the driver in such a way that the tubular body can be released by the locking system in the event of an impact. During this movement one end of at least one driving rod is also moved, while the other end of the driving rod is connected to the support. In this way the movement of the tubular body causes a deformation of the driving rod, by means of which energy is absorbed. The driving rod thus acts as an energy-absorbing deformation element.

On the one hand a disadvantage with this known steering column is that the deformation element is attached to the steering column on the outside, since this increases the construction space required to house the steering column. It is also disadvantageous that the deformation element must be connected on the one hand to the tubular body and on the other hand to the support, because this increases assembly costs. It is additionally disadvantageous that the deformation element is formed as a separate additional component, so that the number of parts in the steering column is increased.

It is the object of the invention to provide an adjustable steering column which, in the event of a crash, yields under the influence of the impact energy of a driver colliding with it and which has a device which absorbs the impact energy and converts it into deformation work, wherein the device is formed in a structurally simple manner and the steering column has few components. Furthermore, by means of the invention it should be achieved that the energy-absorption device does not cause an increase in the necessary installation space for the steering column in the radial direction.

This object is achieved by a steering column having the feature of claim 1 or 2. Advantageous developments of the steering column in accordance with the invention are given in the subordinate claims.

In the steering column in accordance with the invention and in the first embodiment a crash element is provided which protrudes from the holding element in the direction of the operating element, and therefore radially inwards, and which, in the case of a relative displacement between the operating element and the holding element occurring in the event of a crash, is either deformed itself by the operating element and/or deforms the holding element in the vicinity of the crash element so as to dissipate energy. In a second embodiment the steering column in accordance with the invention is provided with a crash element which protrudes from the operating element in the direction of the holding element and therefore radially outwards and which, in the event of a relative displacement between the operating element and the holding element occurring in the event of a crash, is either deformed itself and/or deforms the operating element in the proximity of the crash element so as to dissipate energy. In this way the radial construction space required by the steering column in accordance with the invention is precisely the same size as that of a steering column with the same construction but which does not have any device for absorbing impact energy in the event of a crash, because in the case of the invention the crash elements do not take up any additional construction space outside the steering column.

The invention can fundamentally be implemented in the case of non-adjustable steering columns in which, between the component receiving the steering spindle and the holding element connected to the vehicle body, there is a relative displacement only in the event of a crash. In particular the invention can be applied to steering columns which can be adjusted at least in one adjustment direction, in which an openable and closable clamping device is provided, wherein the operating element is displaceable in the axial direction relative to the holding element when the clamping device is open and is held in an axially fixed manner when the clamping device is closed.

In accordance with the invention the crash element is disposed on at least one wall surface of the holding element or of the operating element and in the event of a crash the operating element is displaced, guided in the axial direction, relative to the holding element owing to the impact force acting thereon. In this way the directed movement of the operating element can be exploited for the deformation of the crash element and/or for the deformation of the holding element or of the operating element so that the kinetic energy of the operating element is converted into deformation work. The resistance element of the operating element or of the holding element allocated to the wall surface with the crash element acts on the crash element during the relative displacement and deforms this crash element and/or the vicinity of the wall surface in which the crash element is disposed.

It is preferable to arrange the crash element in an outer surface on the holding element because at that location the rigidity and therefore the deformation and thus also the degree and progression of the energy absorption can very easily be influenced and such an arrangement is easy to achieve.

The crash element can fundamentally be formed as a distinct component separate from the holding element or operating element, e.g. as a bent sheet metal part or synthetic material element. In this case the crash element can be connected in an integrally bonded, non-positive and/or positive locking manner to the wall surface of the holding element or operating element. In order to receive the crash element on the wall surface, depressions can be produced into the wall surface, into which the crash element is inserted and fixed. The crash element can be fixed in such depressions e.g. by adhesion, soldering or by riveting.

In accordance with a preferred embodiment of the invention the crash element is formed as a crash bead integrally formed into the wall surface. This embodiment has the advantage that no separate components are required. In this embodiment the crash element is rather formed as an integral component of the wall surface and forms a unit therewith. The additional assembly costs associated with connecting a separate crash element to the wall surface do not apply with this embodiment.

In addition to the crash element the at least one wall surface on which the crash element is disposed can have a reinforcing bead. These additional reinforcing beads ensure that the deformation of the vicinity of the wall surface area is limited. For example, when the crash element is disposed in the holding element in which the operating element is guided during a relative movement, the bending of the holding element is reduced. In addition to the reinforcing beads further reinforcements can also be provided such as e.g. a reinforcing sleeve.

In accordance with a further development of the invention the crash element has a cross-sectional shape which changes over its length. In this way it is possible to influence in a controlled manner the quantity of energy absorbed by the crash element in the event of a crash. In so doing the progression of the resistance force can be adjusted in relation to the displacement of the operating element with respect to the holding element in dependence upon the displacement path.

In accordance with a preferred embodiment of the invention with a crash element which has a cross-sectional shape changing over its length the crash element has a run-up ramp on its end facing the operating element or the holding element. By means of this run-up ramp the degree of deformation, and therefore the degree of energy absorption during a relative movement between the operating element and the holding element, is increased gradually and in a controlled manner. At the same time the run-up ramp facilitates the movement by which the operating element or the holding element is pushed onto the crash element.

In accordance with a further development of the invention the run-up ramp ends in a ridge which forms the highest elevation of the crash element with respect to the wall surface of the holding element. The ridge, i.e. the maximum elevation of the crash element is adjoined by a descending support ramp in accordance with a preferred embodiment of the invention. The support ramp serves to provide additional rigidity to the arrangement, analogous to the incorporation of an additional reinforcing bead. By means of the pitch of the support ramp it is possible to influence how far the operating element or alternatively the holding element can be pushed onto the crash element in the event of specific crash loading, i.e. the amount of energy which can be absorbed by the crash element in the case of given impact energy can be influenced by how the support ramp is formed. A parameter which can be varied constructionally in relation to the arrangement of the support ramp is therefore, as stated, the pitch (i.e. the angle which the support ramp forms with the wall surface of the holding element), however, the effect of the support ramp can be influenced in a controlled manner e.g. also by the material thickness of the crash element in the region of the support ramp.

In accordance with an advantageous embodiment of the invention the operating element has an octagonal cross-sectional shape, while the holding element has a substantially U-shaped cross-sectional shape. In this case the wall surface, which comprises the crash element, forms a limb of the U-shaped holding element. In this embodiment of the invention it is also possible easily to provide two, three or even more crash elements instead of a single crash element on the respective wall surfaces of the holding element. Thus, e.g. a second crash element can be disposed on the other limb of the U-shaped holding element. Alternatively or additionally, a further crash element can also be disposed on the wall surfaces connecting the two limbs of the U to each other. Alternatively to, or even in combination with, the crash elements in the holding element one or more crash elements can be disposed in the wall surface regions in the operating element.

The invention is explained in more detail hereinunder with the aid of a drawing. Reference is made to the fact that the invention is not fundamentally limited to the construction of the holding element or of the operating element illustrated in the exemplified embodiment. This means that the holding element does not necessarily have to be formed as a U-shaped bent sheet metal part as in the illustrated exemplified embodiment but rather the holding element can also be formed from two mutually parallel wall surfaces which are not connected to each other. Similarly the operating element can be formed differently than as a sheet metal part with an octagonal cross-section. For example, the operating element could also be formed as a simple square tube or even as a round tube.

Furthermore, it is also possible and feasible to form the holding element as a cast part and to dispose a separate crash element in a wall surface.

For the sake of greater clarity parts of the steering shaft and the attachment of the steering column to the vehicle are not shown in any of the Figures. These elements are not essential to the invention.

Figure 1:
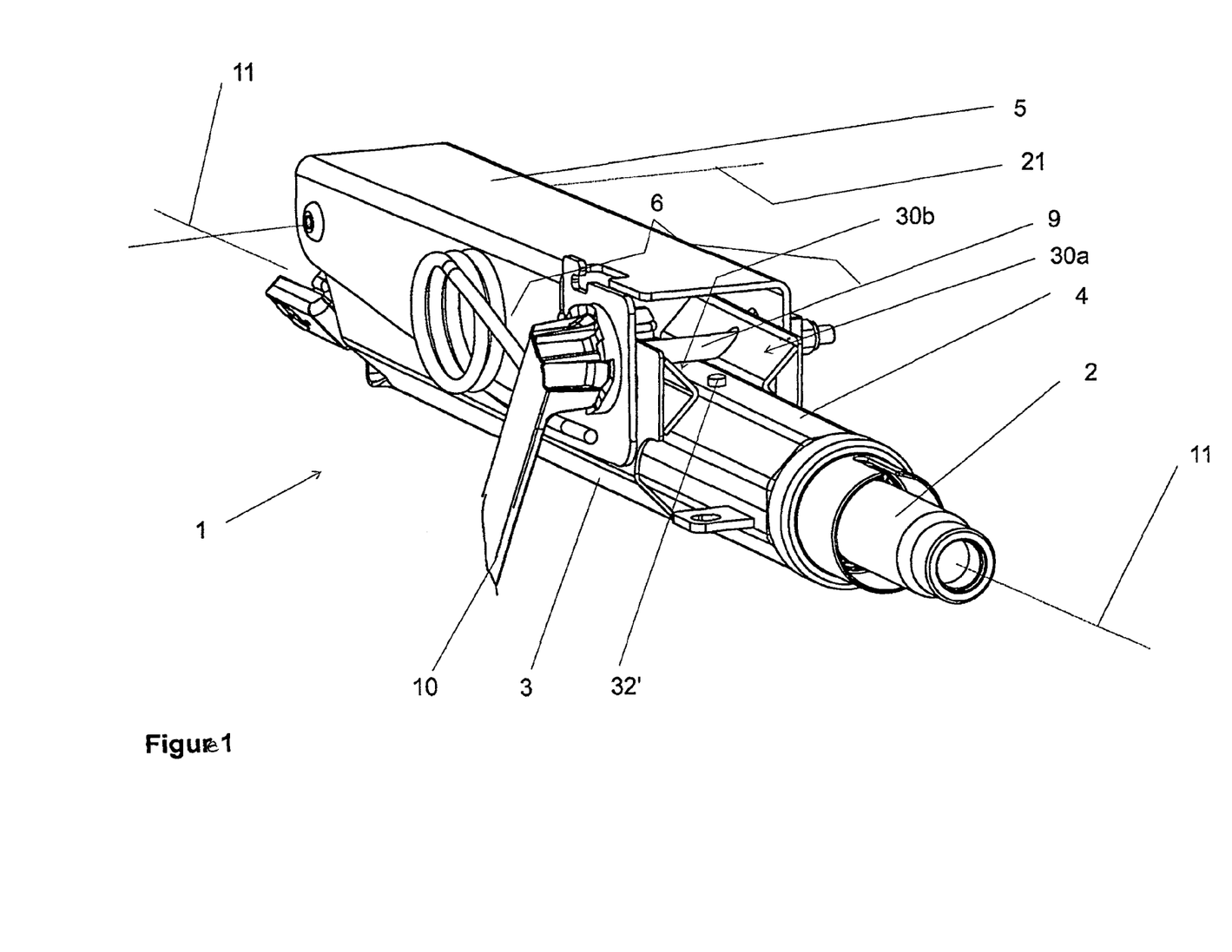
FIG. 1 shows a steering column in accordance with the invention in the assembled state with crash elements which are disposed in the holding element.

FIG. 1 shows the steering column 1 in accordance with the invention in the assembled state. The steering spindle 2 is disposed in a rotatably mounted manner in a tubular operating element 4. The operating element 4 has an octagonal cross-sectional shape. The operating element 4 protrudes with one end into the holding element 3 which is formed in a U-shaped manner. Clamping elements 30a, 30b are disposed on the insides of the limbs of the U, are formed in an angular manner and cooperate with the planar outer surfaces of the octagonal operating element 4. The limbs of the U of the holding element 3 are coupled to each other by a clamping device 6. The clamping device 6 includes an operating lever 10, a tensioning bolt 9 and the clamping elements 30a, 30b. By a movement of the operating lever 10 the limbs of the U of the holding element 3 can be moved towards each other so that the clamping elements 30a, 30b firmly clamp the operating element 4 and firmly hold it in an axially fixed position. Accordingly, with the clamping device (9, 10, 30a, 30b) which can open and close, the operating element (4) can be displaced in the axial direction relative to the holding element (3) when the clamping device (9, 10, 30a, 30b) is open and can be held in an axially fixed manner when the clamping device (9, 10, 30a, 30b) is closed.

The holding element 3 is disposed in a holding clamp 5. In so doing, the holding element 3 is connected to the holding clamp 5 so as to be able to pivot via the pivot axis 21. The holding clamp 5 is connected to the vehicle body, not shown, by fastening elements, not shown.

In the event of a crash the driver is accelerated onto the steering wheel of his vehicle and in this way exerts an impact along the longitudinal axis 11 of the steering spindle 2 and onto the operating element 4. This impact causes the operating element 4 to be displaced axially relative to the holding element 3. The object of the invention is to dissipate the kinetic energy of the operating element 4 in a safe manner during this relative displacement so that the impact for the driver is reduced. In this way severe injuries to the driver should be avoided.

Figure 2:
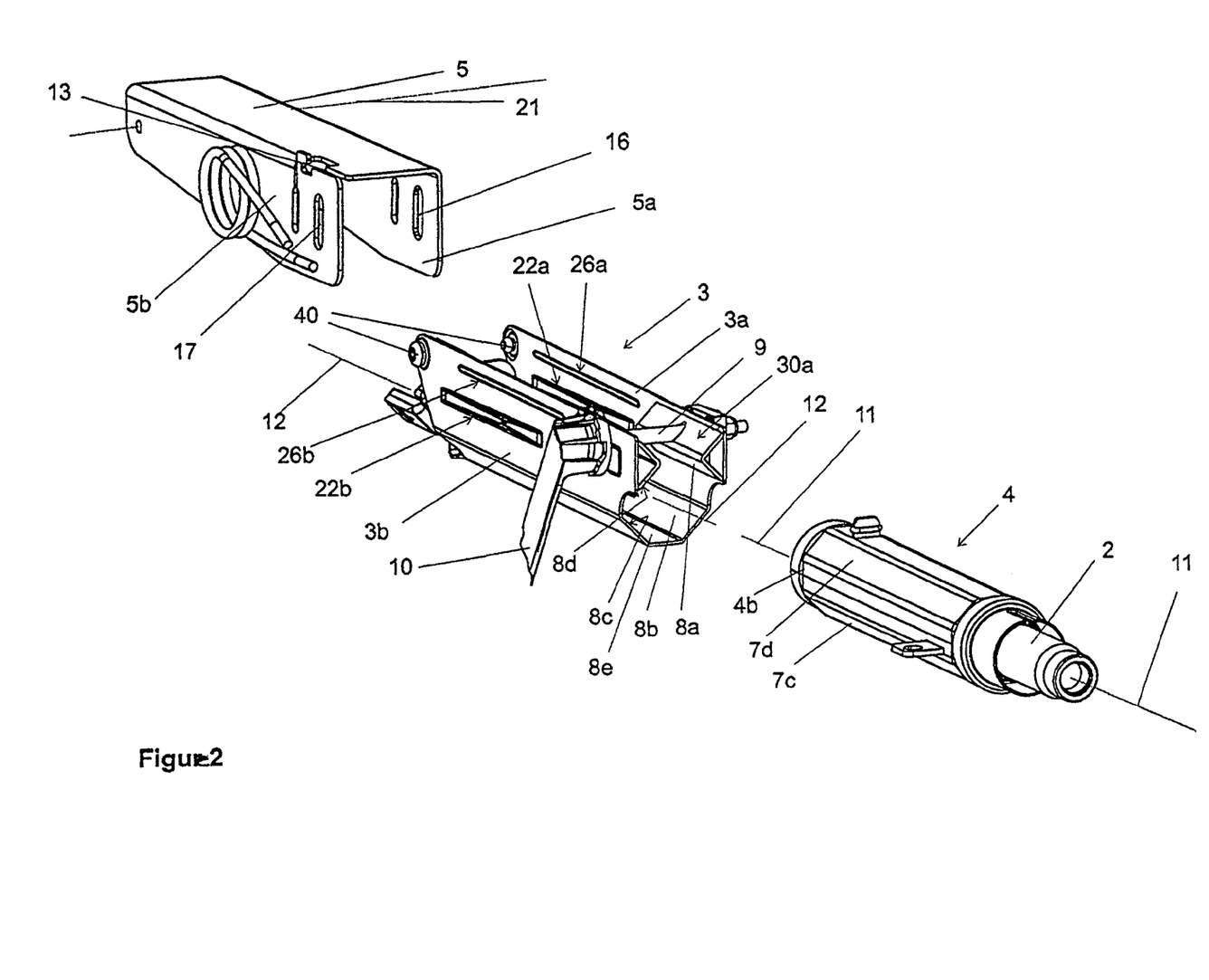
FIG. 2 shows the steering column in accordance with FIG. 1 in an exploded view in which the main assemblies of the steering column are shown separated from each other.

FIG. 2 shows the steering column in accordance with FIG. 1 in an exploded view. The holding clamp 5 connected to the vehicle body in the installed state should be noted. This holding clamp 5 is formed in a U-shaped manner and has two side faces 5a, 5b. Elongate holes 16, 17 are provided in the side faces 5a, 5b and permit an angular adjustment of the steering column about the pivot axis 21 so that the height of the steering wheel of the vehicle can be adjusted.

By reason of its octagonal cross-section the operating element 4 in which the steering spindle 2 is rotatably mounted has eight planar surface portions distributed over the periphery. The reference numerals 7c, 7d designate two of these planar surface portions by way of example. In the assembled state of the steering column the planar surface portion 7d cooperates with the clamping element 8d of the holding element 3 in a clamping manner.

On one of its ends the holding element 3 shown in FIG. 2 has the clamping device 6 including the operating lever 10, the tensioning bolt 9 and the clamping elements 30a, 30b. At the other end of the holding element 3 receiving spigots 40 are provided with which the holding element 3 can be pivotably fastened in the holding clamp 5 so that the holding element 3 is disposed in the holding clamp 5 in such a way as to be pivotable about the pivot axis 21.

The holding element 3 is formed as a substantially U-shaped bent sheet metal part. The limbs of the U of the holding element 3 are formed by wall surfaces 3a, 3b. The crash elements in accordance with the invention are integrally formed into these wall surfaces in the form of crash beads 22a, 22b. In addition to the crash beads 22a, 22b reinforcing beads 26a, 26b are incorporated into the wall surfaces 3a, 3b and make it more difficult to bend the holding element 3 during the crash, which is equivalent to increasing the energy requirement for deforming and bending the holding element. The dimensioning of the reinforcing beads makes it possible to adjust the force progression over the displacement path in the event of a crash. The reinforcing beads 26a, 26b can simultaneously be used as guide elements which serve for the displacement movement of the operating element 4 in the holding element 3.

In the region of the web connecting the two wall surfaces 3a, 3b, planar surface portions 8b, 8c and 8e are formed which, in the assembled state, are allocated to corresponding planar surface portions of the operating element 4. The surface portions 8a, 8d of the clamping elements 30a, 30b cooperate in a clamping manner with associated planar surface portions 7d of the operating element 4.

Figure 3:
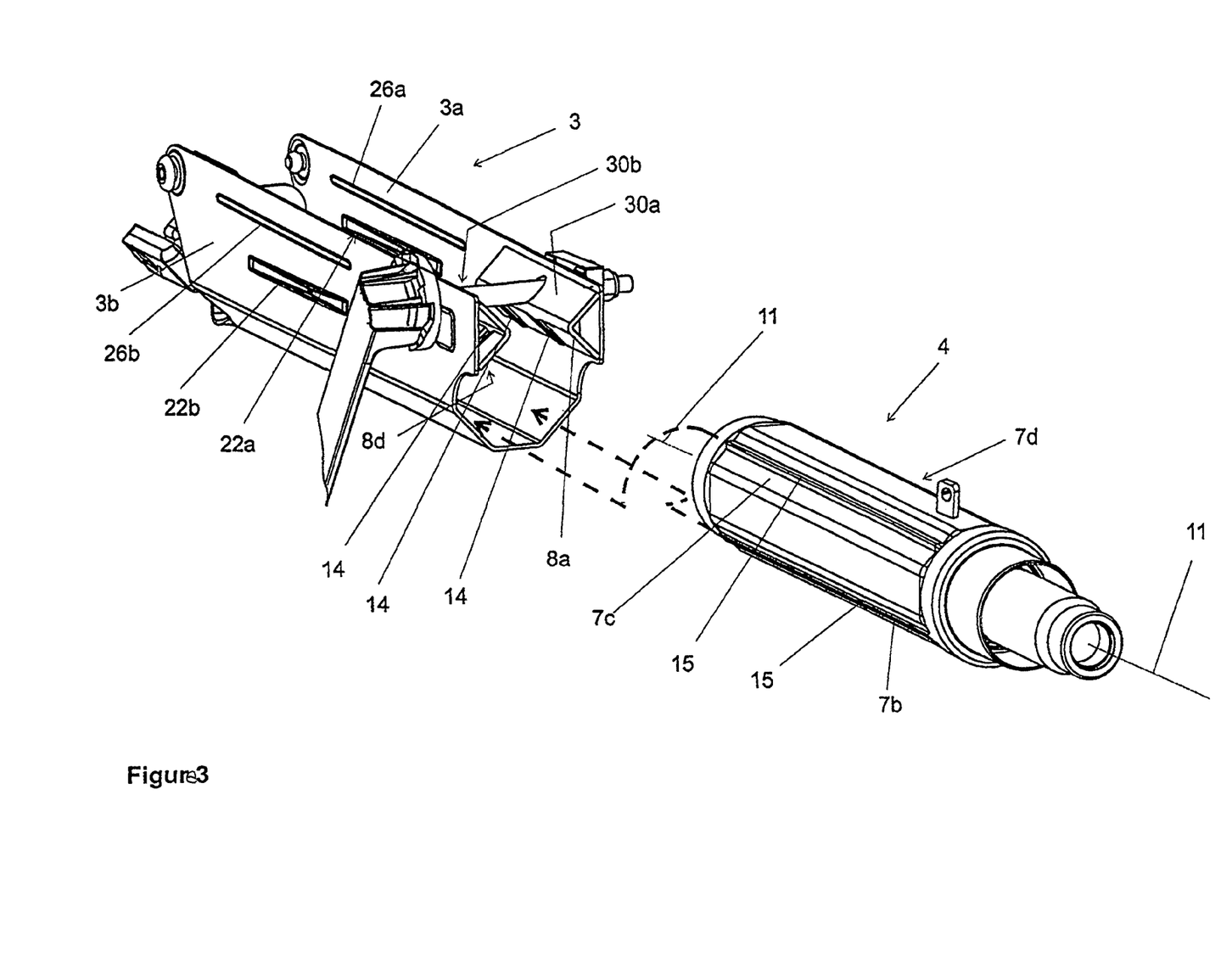
FIG. 3 shows an embodiment of the holding element formed in accordance with the invention modified with respect to the clamping system as compared with FIG. 2.

FIG. 3 shows the holding element 3 and the operating element 4 in an enlarged view. To explain the different possibilities for firmly clamping the operating element 4 in the holding element 3 FIG. 3 illustrates different possibilities for formation of the clamping system. Thus the clamping element 30a has strip-like protrusions 14 on its clamping surface 8a, which in the clamping state act upon the associated planar surface of the operating element 4. In this way increased surface pressing and—in comparison to a simple planer clamping surface 8a—a reduced tendency to "pitting" of the two components can be achieved. Alternatively, the advantages can also be achieved by providing a strip-like protrusion 15 on a planar surface of the operating element 4, which protrusion cooperates with the associated clamping surface 8d of the clamping element 30b. The arrows shown in broken lines indicate how the operating element 4 is pushed into the holding element 3 for the purpose of assembling the steering column. The crash beads 22a, 22b and reinforcing beads 26a, 26b are disposed in the wall surfaces 3a, 3b of the U-shaped holding element 3.

Figure 4:
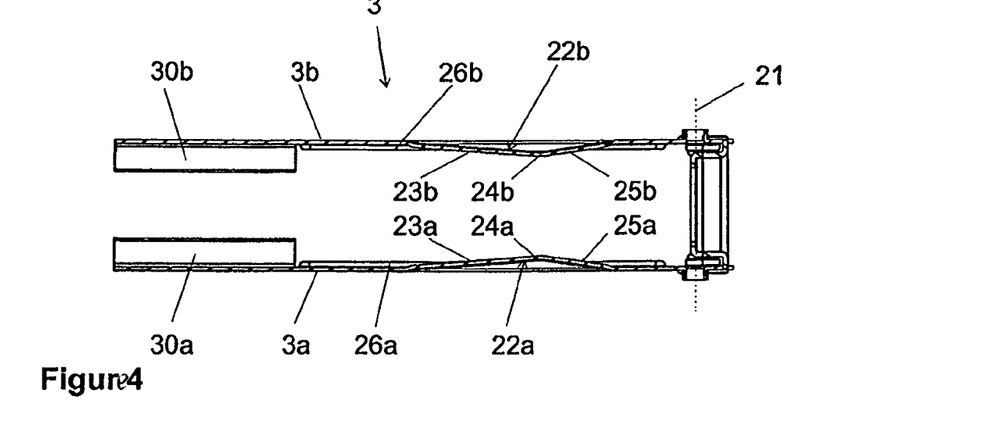
FIG. 4 shows a view of the holding element formed in accordance with the invention, wherein the viewing direction of the observer is from the closed side of the U-shaped holding element parallel to the limbs of the U.

FIG. 4 illustrates the holding element 3 in accordance with the invention, wherein the viewing direction of the observer is directed from the closed base of the U-shaped holding element 3 in the direction of the opening (upwards). The clamping elements 30a, 30b are disposed internally on the wall surfaces 3a, 3b. Furthermore, the crash beads 22a, 22b are integrally formed into the wall surfaces 3a, 3b. The crash beads 22a, 22b are therefore an integral component of the wall surfaces 3a, 3b. The crash beads formed in this manner require no separate component for energy absorption in the event of a crash.

In addition to the crash beads 22a, 22b, reinforcing beads 26a, 26b are introduced into the wall surfaces 3a, 3b. On the end of the holding element 3, on the right in FIG. 4, outwardly directed protuberances of the wall surfaces 3a, 3b are provided. With these protuberances the holding element 3 can be pivotably attached in the holding clamp 5 (cf. FIGS. 1 and 2) so that the holding element 3 can be pivoted relative to the holding clamp 5 about the pivot axis 21.

The crash beads 22a, 22b have a shape which changes in the axial direction. On the end of the crash beads 22a, 22b remote from the pivot axis 21 these crash beads firstly have a ramp-like portion which forms the run-up ramp 23a, 23b. At their maximum elevation with respect to the wall surfaces 3a, 3b the crash beads 22a, 22b each have a ridge 24a, 24b. This ridge is then adjoined by a second-ramp-like portion which forms the respective support ramp 25a, 25b. According to which axial position is occupied by the ridge 24a, 24b and at which angle the support ramps 25a, 25b extend relative to the wall surface 3a, 3b, the crash beads 22a, 22b can have a different absorption property for the kinetic energy arising in the event of a crash.

Figure 5:
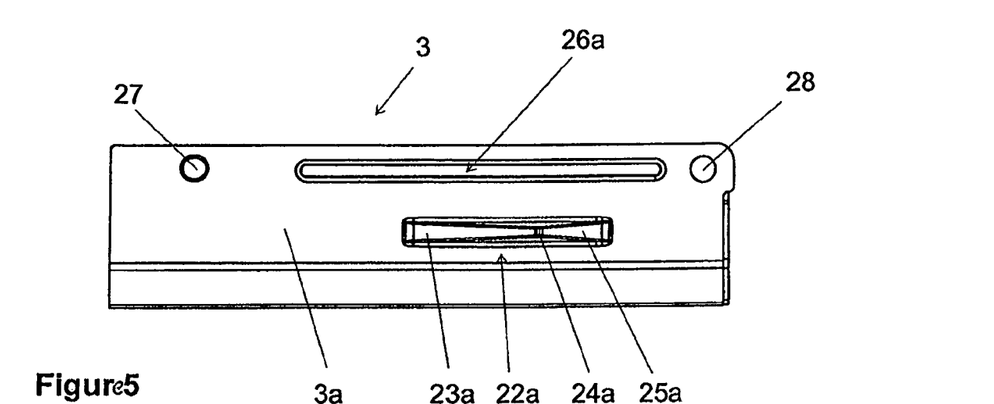
FIG. 5 shows a side view of the holding element in accordance with FIG. 4.

For the sake of better understanding, FIG. 5 shows a side view of the holding element formed in accordance with the invention. This shows the wall surface 3a with the crash bead 22a and the reinforcing bead 26a. The apertures 27 and 28 are also shown. The aperture 27 serves for passage of the tensioning bolt 9 of the clamping device 6, while the aperture 28 serves to receive the pivot axis 21. FIG. 5 clearly shows the differently formed regions of the crash bead 22a, namely the run-up ramp 23a, the support ramp 25a and the maximum elevation, the ridge 24a, located between the two ramp-like portions.

Figure 6:
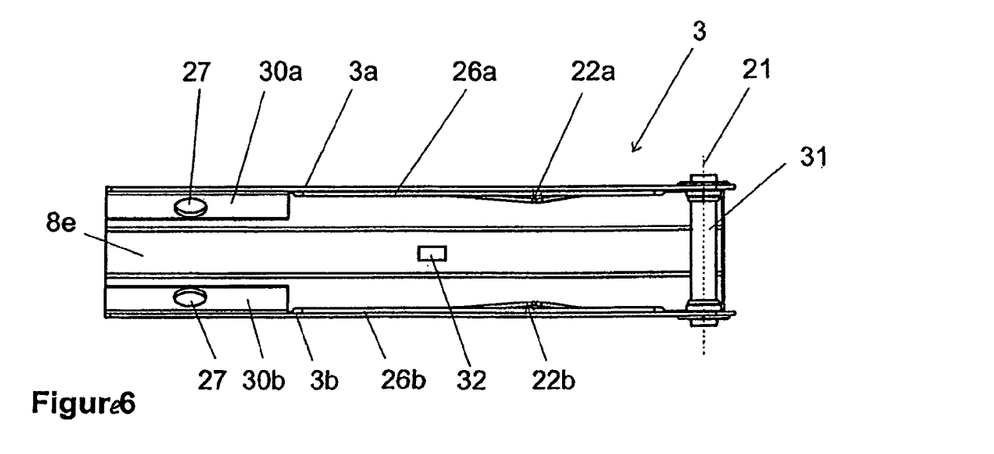
FIG. 6 shows a plan view of an embodiment of the holding element in accordance with the invention modified as compared with FIGS. 4 and 5.

FIG. 6 shows a plan view of the holding element in accordance with FIGS. 4 and 5, i.e. the viewing direction of the observer is from the open side of the U-shaped holding element 3 towards the closed side.

In the holding element 3 shown in FIG. 6 a pin 31 is provided, the longitudinal axis of which forms the pivot axis 21 of the holding element 3. The pin 31 can consist of solid material or be formed in a sleeve-like manner. The pin 31 serves at the same time to reinforce the holding element 3 and increases its rigidity. However, alternatively it is also feasible and possible to form the pivot axis 21 by individual rotatably mounted connections between the operating element 4 and the holding element 3, e.g. by two individual rivet connections. This is particularly necessary in the case where the pivot axis 21 bisects the steering spindle 2.

On the lower planar surface portion 8e of the holding element 3 a break-off element 32 is disposed. The break-off element 32 forms a longitudinal stop for the operating element 4, i.e. when the operating element 4 is pushed into the holding element 3 to an appropriate extent, it comes into position against the break-off element 32 and is supported thereon. Only when a defined force is exceeded in the axial direction does the break-off element 32 break away and release the path for a further axial displacement of the operating element 4 relative to the holding element 3. Only when the break-off element has broken away can the operating element 4 move into the crash beads 22a 22b and deform the wall surfaces 3a, 3b on the holding element 3 and/or the crash beads 22a, 22b in an energy absorbing manner.

The break-off element can be formed in a variety of ways. In the preferred embodiment the break-off element 32 is formed as a synthetic material spigot which is pressed into the holding element 3 and protrudes into the opening which the holding element 3 surrounds. Alternatively the break-off element 32' (cf. FIG. 1) can be disposed on the operating element 4 and define the displacement of the operating element 4 with respect to the holding element 3 by the stop on the tensioning bolt 9. In the event of a crash the displacement force exceeds the resistance force of the break-off element and the break-off element shears off so that further displacement of the operating element 4 with respect to the holding element 3 is made possible.

Figure 7:
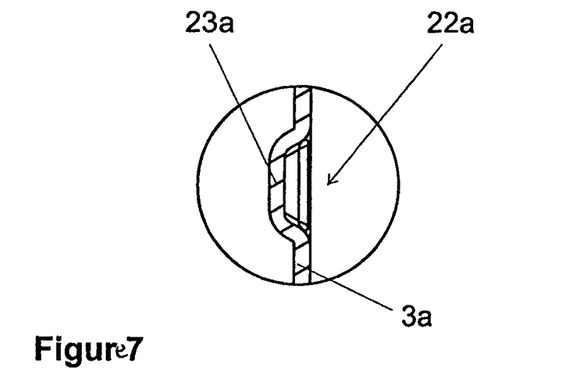
FIG. 7 shows a cross-sectional view through the run-up ramp of the crash element.
Figure 8:
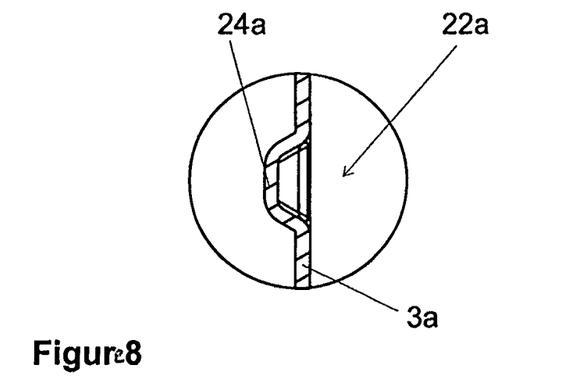
FIG. 8 shows a cross-sectional view through the maximum elevation (ridge) of the crash element.
Figure 9:
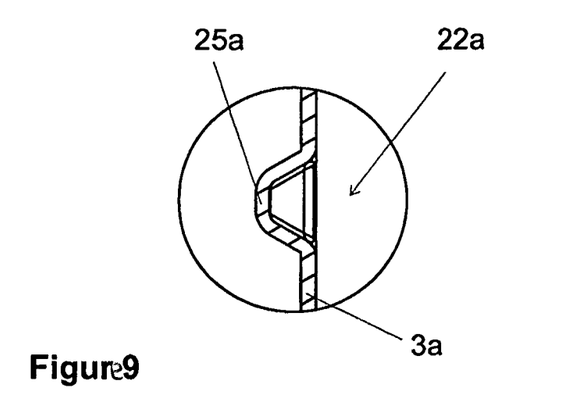
FIG. 9 shows a cross-sectional view through the support ramp of the crash element.

Different cross-sections through the crash bead 22a are shown in FIGS. 7, 8 and 9. In FIG. 7 the cross-section is taken through the run-up ramp 23a of the crash bead, while in FIG. 8 the cross-section is taken through the maximum elevation of the crash bead, namely the ridge 24a. In FIG. 9 the cross-section is taken through the support ramp 25a. From FIG. 7 to 9 it is clear that the individual portions of the crash bead 22a are formed differently i.e. the individual portions of the crash bead 22a have different cross-sectional shapes. In addition to the angle of incidence of the support ramp relative to the wall surface 3a the cross-sectional shape of the support ramp 25 is a further parameter by which the constructor can influence the amount of energy absorbed by the crash bead in the event of a crash.

In a particularly advantageous manner by means of the height progression of the run-up ramp 23a, 23b over the length, the level of the resistance force against further displacement of the operating element 4 with respect to the holding element 3 in the event of a crash can be adjusted at the respective momentary location of the displacement. In this way a defined force progression can be predetermined.

Figure 10:
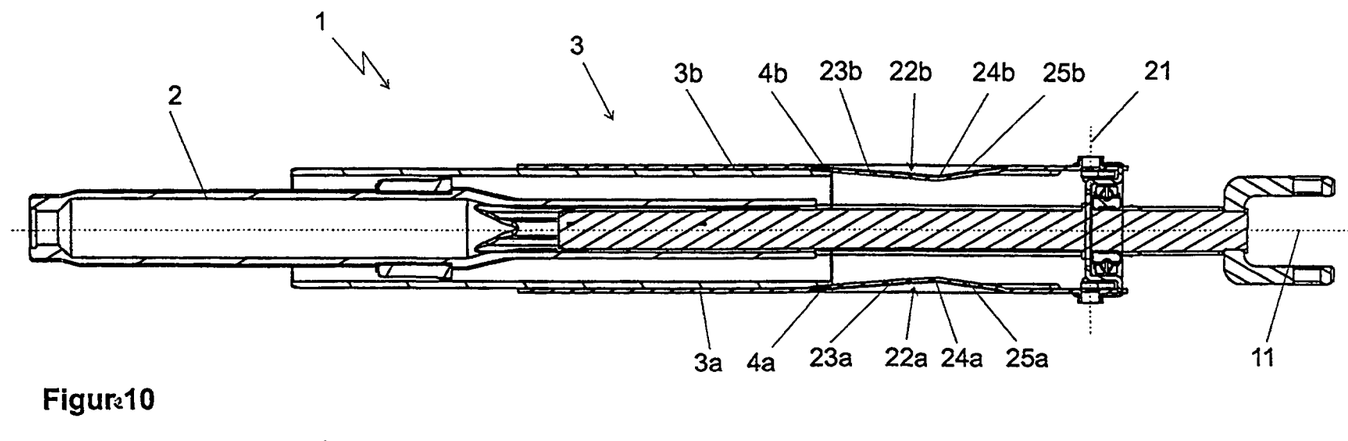
FIG. 10 shows the assembled steering column in its axially shortest state, i.e. with the operating element pushed into the holding element to the maximum extent.

FIG. 10 shows the steering column 1 in accordance with the invention in the assembled state. In the state illustrated in FIG. 10 the steering column 1 is at its smallest axial extension in the normal operating state, i.e. not in the event of a crash. The operating element 4 is thus pushed into the holding element 3 so far that with its outer wall, in particular with its resistance elements 4a, 4b, it lies at the start of the crash beads 22a, 22b. If an impact then acts upon the steering spindle 2 from the left in FIG. 10, the operating element 4 would be displaced relative to the holding element 3, deforming the crash beads 22a, 22b. In so doing the kinetic energy of the operating element 4 being released in the event of a crash would gradually be absorbed as the crash beads 22a, 22b become increasingly deformed. In this way the risk of injury to the driver is reduced.

Figure 11:
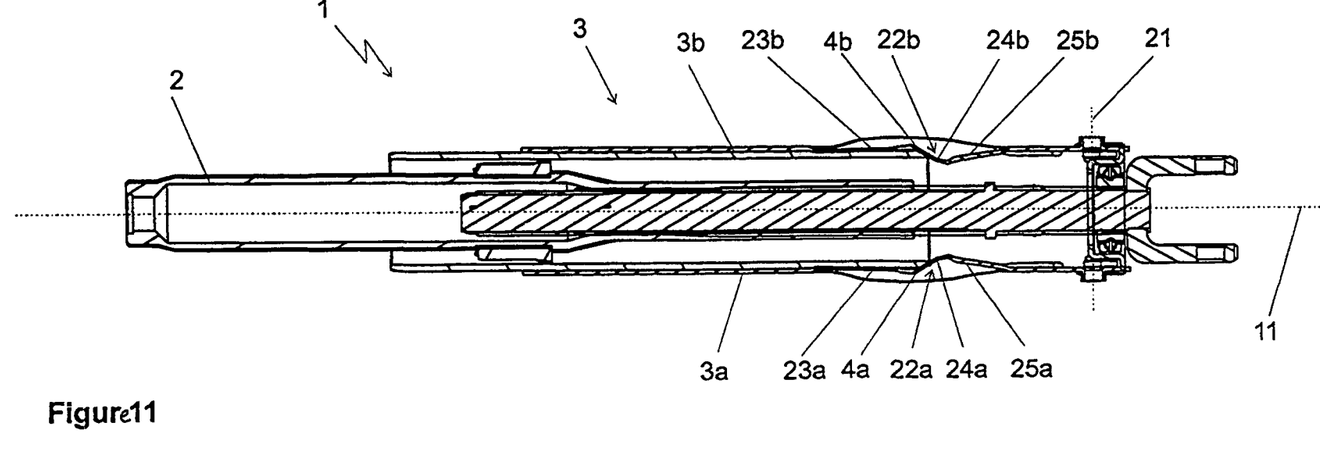
FIG. 11 shows the steering column in accordance with the invention after a crash with the crash element deformed and the holding element deformed.

FIG. 11 shows the state of the steering column in accordance with FIG. 10 after a crash. In FIG. 11 both the deformation of the crash beads 22a, 22b and also the deformation of the wall surfaces 3a, 3b are shown. In particular the wall surfaces 3a, 3b are widened in the region of the crash elements. Depending on the constructional features it can be desired to limit or even prevent the deformation of the crash elements, in this case the crash beads 22a, 22b, or of the wall surfaces 3a, 3b in which the crash elements are disposed. The person skilled in the art can achieve this through appropriate arrangement of the crash element and the wall surfaces.

It is clear that when using crash beads 22a, 22b as a crash element, with the conventional sheet metal thicknesses in the range of 1 mm to 2 mm, the crash element is extremely stiff and can be deformed only with considerable surface pressing. The precision with which the force level is set depends very heavily on the precision with which the crash elements are formed. In the case where deformation of the wall surfaces 3a, 3b is provided for the purpose of energy absorption, the tolerance requirement with respect to dimensional stability and material property is comparatively low.

Figure 12:
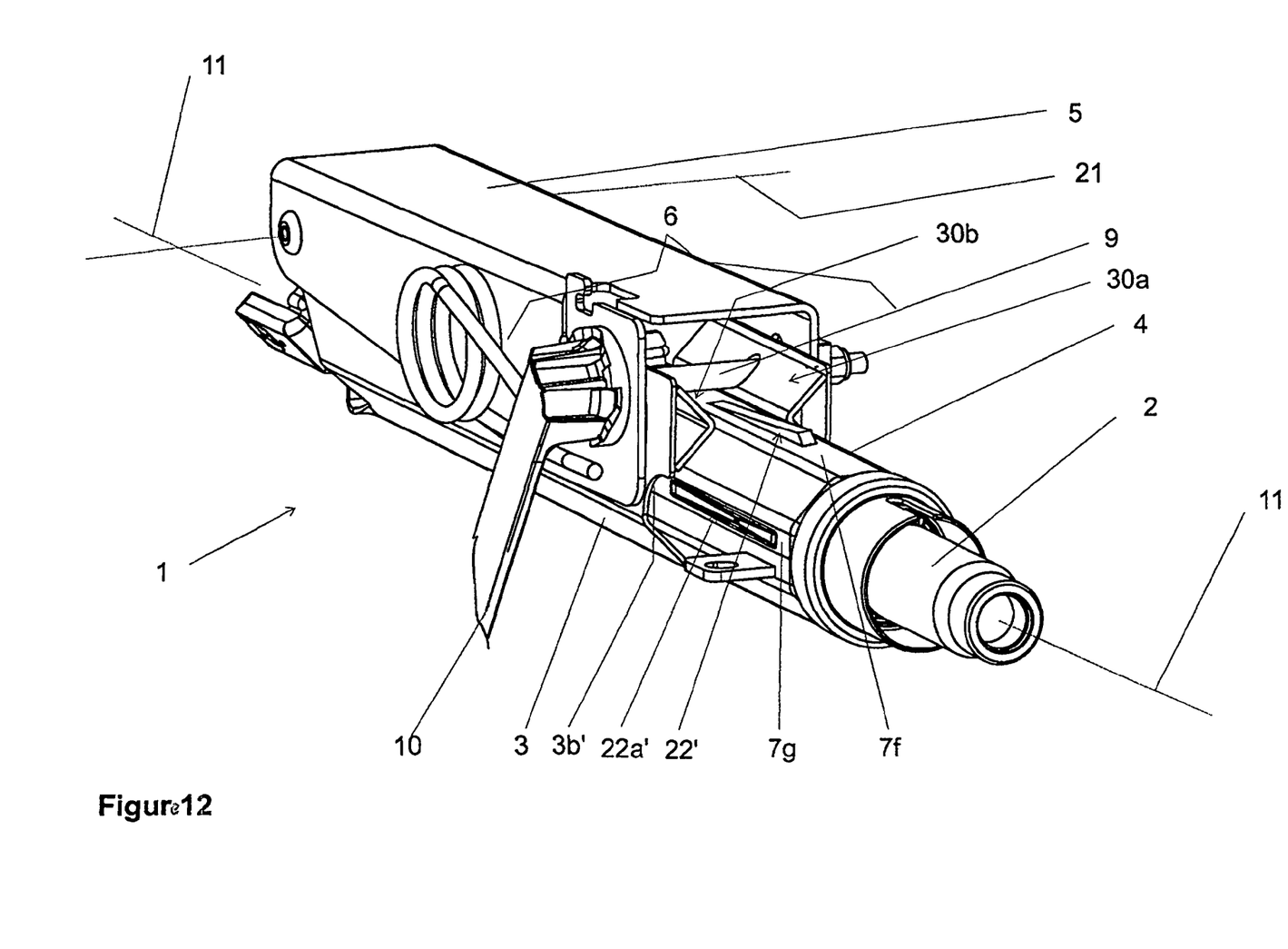
FIG. 12 shows a steering column in accordance with the invention in the assembled state with crash elements which are disposed in the operating element.

FIG. 12 shows an alternative embodiment of the invention in which a crash element 22' is disposed in a wall surface 7f and a further crash element 22a' is disposed in a wall surface 7g in the operating element 4. The resistance element in the event of a crash can be either an outer surface 3b' disposed on the holding element 3 or simply the tensioning bolt 9 which is non-displaceably disposed with respect to the holding element 3 in the direction of the longitudinal axis 12 of the holding element 3. This alternative embodiment can also be used in operating elements 4 with a circular or other outer cross-sectional surface. The statements made above in relation to features in the other embodiments of the invention can be analogously transferred to this embodiment.

Furthermore, the invention can also be used for steering columns, in which the steering spindle is disposed so as to be displaceable in relation to the holding element only in a vertical or longitudinal direction or is disposed so as to be totally non-displaceable in the normal operating state, i.e. except in the event of a crash. Steering columns of this type can be arranged in such a way that after a preset force is exceeded, a displacement of the steering spindle, and accordingly of the operating element supporting the steering spindle, in the longitudinal direction is made possible. In accordance with the invention in the holding element or in the operating element supporting the steering spindle one or a plurality of corresponding crash elements are then provided which exert a corresponding resistance force against displacement of the operating element with respect to the holding element.

It is clear that the embodiments of the invention proposed herein can be combined and exchanged with one another without departing from the scope of the invention.

| Reference list | |
|---|---|
| 1 | Steering column |
| 2 | Steering spindle |
| 3 | Holding element |
| 3a, 3b | Wall surface |
| 3b' | Outer surface |
| 4 | Operating element |
| 4a, 4b | Resistance elements |
| 5 | Holding clamp |
| 6 | Clamping device |
| 7c, 7d | Planar surface portions |
| 7f, 7g | Wall surface |
| 8a, b, c, d, e | Planar surface portions |
| 9 | Tensioning bolt |
| 10 | Operating lever |
| 11 | Longitudinal axis, operating element |
| 12 | Longitudinal axis, holding element |
| 13 | Slit |
| 21 | Pivot axis |
| 22' | Crash bead |
| 22a, 22b | Crash bead |
| 22a' | Crash bead |
| 23a, 23b | Run-up ramp |
| 24a, 24b | Ridge |
| 25a, 25b | Support ramp |
| 26a, 26b | Reinforcing bead |
| 27 | Aperture |
| 28 | Aperture |
| 30a, 30b | Clamping element |
| 31 | Pin |
| 32, 32' | Break-off element |

The invention claimed is:

1. Steering column for a motor vehicle, comprising:
   a) a steering spindle which is mounted so as to be able to rotate about its longitudinal axis in an operating element, wherein the operating element has at least one first resistance element;
   b) a holding element which has at least one wall surface, wherein, when the steering column is in the assembled state, the operating element is disposed within the holding element so as to be guided in a displaceable manner in the axial direction at least in the event of a crash and the first resistance element of the operating element is allocated to the wall surface;
   c) wherein the at least one wall surface of the holding element has an integral crash element with a run-up ramp on an end of the crash element facing the operating element, wherein the run-up ramp protrudes in the direction of the operating element and the run-up ramp that is integral with the at least one wall surface is deformable in an energy dissipating manner by the operating element in the event of a relative displacement between the operating element and the holding element occurring in the event of a crash.

2. Steering column for a motor vehicle, comprising:
   a) a steering spindle which is mounted so as to be able to rotate about its longitudinal axis in an operating elements, wherein the operating element has at least one first wall surface;
   b) a holding element which has at least one resistance element, wherein, when the steering column is in the assembled state, the operating element is disposed within the holding element so as to be guided in a displaceable manner in the axial direction at least in the event of a crash and the first wall surface of the operating element is allocated to the resistance element;
   c) wherein the at least one wall surface of the operating element has an integral crash element with a run-up ramp, wherein the run-up ramp protrudes in the direction of the holding element and the run-up ramp that is integral with the at least one wall surface is deformable in an energy dissipating manner by the operating element in the event of a relative displacement between the operating element and the holding element occurring in the event of a crash.

3. The steering column as claimed in claim 1, wherein the steering column can be adjusted in at least one adjustment direction, and an openable and closable clamping device is provided, wherein the operating element is displaceable in the axial direction relative to the holding element when the clamping device is open and is held in an axially fixed manner when the clamping device is closed.

4. The steering column as claimed in claim 1, wherein the at least one wall surface of the holding element has a reinforcing bead in addition to the crash element.

5. The steering column as claimed in claim 1, wherein the crash element has a cross-sectional shape which changes over its length.

6. Steering column for a motor vehicle, comprising:
   a) a steering spindle which is mounted so as to be able to rotate about its longitudinal axis in an operating element, wherein the operating element has at least one first resistance element;
   b) a holding element which has at least one wall surface, wherein, when the steering column is in the assembled state, the operating element is disposed within the holding element so as to be guided in a displaceable manner in the axial direction at least in the event of a crash and the first resistance element of the operating element is allocated to the wall surface;
   c) wherein the at least one wall surface of the holding element has an integral crash element with a run-up ramp on an end of the crash element facing the operating element, wherein the run-up ramp protrudes in the direction of the operating element and the run-up ramp that is integral with the at least one wall surface is deformable in an energy dissipating manner by the operating element in the event of a relative displacement between the operating element and the holding element occurring in the event of a crash,
   wherein the at least one wall surface of the holding element has a reinforcing bead in addition to the crash element,
   wherein the run-up ramp is adjoined by a ridge which forms the highest elevation of the crash element with respect to the wall surface.

7. The steering column as claimed in claim 6, wherein the ridge is adjoined by a descending support ramp.

8. The steering column as claimed in claim 1, wherein the operating element has an octagonal cross-sectional shape and that the holding element has a substantially U-shaped cross-sectional shape, wherein the at least one wall surface, which forms a limb of the U-shaped holding element comprises the crash element.

9. The steering column as claimed in claim 2, wherein the steering column can be adjusted in at least one adjustment direction, and an openable and closable clamping device is provided, wherein the operating element is displaceable in the axial direction relative to the holding element when the clamping device is open and is held in an axially fixed manner when the clamping device is closed.

10. The steering column as claimed in claim 2, wherein the at least one wall surface of the holding element has a reinforcing bead in addition to the crash element.

11. The steering column as claimed in claim 2, wherein the crash element has a cross-sectional shape which changes over its length.

12. The steering column as claimed in claim 2, wherein the operating element has an octagonal cross-sectional shape and that the holding element has a substantially U-shaped cross-sectional shape, wherein the at least one wall surface, which forms a limb of the U-shaped holding element comprises the crash element.

13. The steering column as claimed in claim 6, wherein the crash element has a cross-sectional shape which changes over its length.

14. The steering column as claimed in claim 6, wherein the operating element has an octagonal cross-sectional shape and that the holding element has a substantially U-shaped cross-sectional shape, wherein the at least one wall surface, which forms a limb of the U-shaped holding element comprises the crash element.

* * * * *